United States Patent
Israelsson et al.

(10) Patent No.: US 9,912,608 B2
(45) Date of Patent: Mar. 6, 2018

(54) METHOD AND SYSTEM FOR MINIMIZING THE REQUIRED BANDWIDTH FOR A CLOUD BASED UNICAST COMMUNICATION WITH A VEHICLE

(71) Applicant: VOLVO CAR CORPORATION, Gothenburg (SE)

(72) Inventors: Erik Israelsson, Gothenburg (SE); Karl-Johan Jonsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/203,048

(22) Filed: Jul. 6, 2016

(65) Prior Publication Data
US 2017/0019349 A1   Jan. 19, 2017

(30) Foreign Application Priority Data
Jul. 13, 2015   (EP) .................................... 15176444

(51) Int. Cl.
*H04W 4/02* (2009.01)
*G01C 21/26* (2006.01)
(Continued)

(52) U.S. Cl.
CPC .............. *H04L 47/80* (2013.01); *G01C 21/26* (2013.01); *G05D 1/0088* (2013.01);
(Continued)

(58) Field of Classification Search
CPC ........ H04L 47/80; H04L 67/18; H04W 4/027; H04W 4/028; H04W 4/046; H04W 28/06; G05D 1/0088; G01C 21/26
See application file for complete search history.

(56) References Cited

U.S. PATENT DOCUMENTS

| | | | | |
|---|---|---|---|---|
| 4,005,266 A | * | 1/1977 | Lehr ........................ | G04G 7/00 375/343 |
| 4,161,786 A | * | 7/1979 | Hopkins ............... | G06F 13/372 370/460 |

(Continued)

FOREIGN PATENT DOCUMENTS

| | | |
|---|---|---|
| EP | 1788749 A1 | 5/2007 |
| EP | 2280240 A2 | 2/2011 |

OTHER PUBLICATIONS

Extended European Search Report and Written Opinion dated Nov. 19, 2015, from related European Application No. 15176444.6, 5 pages.

*Primary Examiner* — Rodney A Butler
(74) *Attorney, Agent, or Firm* — Brooks Kushman P.C.

(57) ABSTRACT

Disclosed herein is a method and system for minimizing the required bandwidth for a cloud based unicast communication with a vehicle operating within a road network, where the cloud comprises a cloud logic and the vehicle comprises a vehicle internal logic. The method comprising the steps of: determining a current position with direction of the vehicle within the road network; setting an interval at which the vehicle is to report an update on its position based on a most probable path of the vehicle and the complexity thereof, where the most probable path is a set of possible paths a predetermined distance ahead of the vehicle that it is most probable to travel along given its current position with direction within the road network; communicating the set interval to the vehicle internal logic; and reporting an updated current position of the vehicle to the cloud with the set reporting interval.

15 Claims, 3 Drawing Sheets

(51) Int. Cl.
*G05D 1/00* (2006.01)
*G08G 1/09* (2006.01)
*H04L 12/927* (2013.01)
*H04W 4/04* (2009.01)
*H04L 29/08* (2006.01)
*G08G 1/01* (2006.01)
*G08G 1/0967* (2006.01)
*G08G 1/00* (2006.01)

(52) U.S. Cl.
CPC ..... *G08G 1/0112* (2013.01); *G08G 1/096716* (2013.01); *G08G 1/096741* (2013.01); *G08G 1/096775* (2013.01); *G08G 1/20* (2013.01); *H04L 67/18* (2013.01); *H04W 4/027* (2013.01); *H04W 4/028* (2013.01); *H04W 4/046* (2013.01)

(56) References Cited

U.S. PATENT DOCUMENTS

| | | | | |
|---|---|---|---|---|
| 6,473,450 | B1* | 10/2002 | Sutterlin | H04B 1/707 340/12.32 |
| 2002/0120394 | A1 | 8/2002 | Rayne | |
| 2004/0081193 | A1* | 4/2004 | Forest | H04L 12/417 370/458 |
| 2005/0226201 | A1* | 10/2005 | McMillin | H04L 45/00 370/348 |
| 2014/0309789 | A1* | 10/2014 | Ricci | B60Q 1/00 700/276 |

* cited by examiner

METHOD AND SYSTEM FOR MINIMIZING THE REQUIRED BANDWIDTH FOR A CLOUD BASED UNICAST COMMUNICATION WITH A VEHICLE

CROSS-REFERENCE TO RELATED APPLICATIONS

This application claims foreign priority benefits under 35 U.S.C. § 119(a)-(d) to European patent application number EP 15176444.6, filed Jul. 13, 2015, which is incorporated herein by reference in its entirety.

TECHNICAL FIELD

The present disclosure relates to a method for minimizing the required bandwidth for a cloud based unicast communication with a vehicle which is connected to the cloud and operates within a road network, where the cloud comprises a cloud logic and the vehicle comprises a vehicle internal logic. The disclosure further relates to a system for minimizing the required bandwidth for a cloud based unicast communication with a vehicle which is connected to the cloud and operates within a road network, where the cloud comprises a cloud logic and the vehicle comprises a vehicle internal logic.

BACKGROUND

It is a current trend that future vehicles will be connected. Connectivity provides new means for both safety and convenience applications as well as autonomous driving. Connectivity between vehicles can be realized both through direct communication between vehicles and between vehicles and roadside infrastructure, e.g., using automotive Wireless Fidelity (WiFi) according to the IEEE 802.11p standard, also referred to as Intelligent Transportation System operating in the 5 GHz frequency band (ITS G5), and also through communication over an existing mobile cell network. Communication in this way may e.g., be via some cloud-based back-end system.

A challenge related to cloud-based communication between vehicles or between vehicles and infrastructure is that many communication messages may need to be routed from the cloud to specific vehicles, often based on the location of the vehicle, i.e. using unicast of messages rather than broadcast of messages.

Previously known solutions to manage distribution of information to vehicles based on the locations of the vehicles have proposed a pattern where the same subset of data, relevant to an area or to a position within the area, is sent to all vehicles within that area. This may be done through applying a grid pattern that defines areas in which the same information is broadcast to all vehicles therein. In this case, the actual communication implementation could be unicast, i.e. cloud-to-one-vehicle, but since the same data is communicated to all vehicles in the area, it is in practice a broadcast. This previously known solution is a relatively rough method since vehicles will receive a fair amount of irrelevant data, including data related to roads that the vehicle is unlikely to travel. This might be relevant e.g., in cases where there are no interconnections between local roads next to a highway road although the roads are close to each other in the same geographical area.

A prerequisite for a unicast solution to work is that a message routing logic in the cloud must have access to the current position of all connected vehicles, in order to be able to route information only to those vehicles in the road network to which the information in the message is relevant. This prerequisite requires the connected vehicles to report their present position to the cloud with some interval. The position reporting will have to be frequent enough in order to keep the location of the vehicle up-to-date and will constitute a significant part of the overall data traffic occurring for these types of cloud based applications. Despite the data traffic incurred by a required update of the current position of each connected vehicle, this type of unicast solution is still motivated since an alternative broadcast solution where all messages are transmitted out to all vehicles is estimated to result in an significantly higher usage of bandwidth to each vehicle.

However, there is still room for improvements relating to this type of cloud based unicast communication solutions.

SUMMARY

Embodiments herein aim to provide an improved method for minimizing the required bandwidth for a cloud based unicast communication with a vehicle which is connected to the cloud and operates within a road network, where the cloud comprises a cloud logic and the vehicle comprises a vehicle internal logic.

This is provided through a method that comprises the steps of: determining a current position with direction of the vehicle within the road network; setting an interval at which the vehicle is to report an update on its position to the cloud based on a most probable path of the vehicle and the complexity of this most probable path, where the most probable path of the vehicle is a set of possible paths a predetermined distance ahead of the vehicle that the vehicle is most probable to travel along given its current position with direction within the road network; communicating the set interval to the vehicle internal logic; reporting an updated current position of the vehicle to the cloud with the set reporting interval, thus providing for minimizing the required bandwidth through reducing the required amount of data traffic caused by the position reporting in a cloud based unicast communication with a vehicle which is connected to the cloud of this kind, which position reporting, in order to keep the location of the vehicle up-to-date, will constitute a significant part of the overall data traffic occurring.

According to a second embodiment is provided that the method further comprises having the cloud logic or the vehicle internal logic set the interval at which the vehicle is to report an update on its position through determining the most probable path of the vehicle and analyzing the determined most probable path with respect to complexity using a map of the road network.

The provision of determining the most probable path of the vehicle and analyzing the determined most probable path with respect to complexity using a map of the road network provides an effective way of defining the interval at which a vehicle should report its position in order to minimize the required amount of data traffic between the vehicle and the cloud.

According to a third embodiment is provided that the method further comprises arranging or configuring the cloud logic or the vehicle internal logic to reduce the interval at which the vehicle is to report the update on its position if the complexity of the determined most probable paths increases between position reports; and to increase the interval at which the vehicle is to report the update on its position if the complexity of the determined most probable paths decreases between position reports.

The provision of adapting the interval at which the vehicle is to report the update on its position to the complexity of the determined most probable paths, provides an improved ability to accurately track the position of the vehicle and perform more accurate predictions of most probable paths and thus setting appropriate future reporting intervals.

According to a fourth embodiment is provided that the method further comprises arranging or configuring the cloud logic or the vehicle internal logic to determine the interval at which the vehicle is to report an update on its position using a map of the road network comprising speed limits for road segments included in the most probable path, and to reduce the interval at which the vehicle is to report the update on its position if the speed limits of the determined most probable paths increases between position reports; and to increase the interval at which the vehicle is to report the update on its position if the speed limits of the determined most probable paths decreases between position reports.

The provision of determining the interval at which the vehicle is to report an update on its position using a map of the road network comprising speed limits further provides an improved ability to accurately track the position of the vehicle and perform more accurate predictions of most probable paths and thus setting appropriate future reporting intervals.

According to a fifth embodiment is provided that the method further comprises arranging or configuring the cloud logic or the vehicle internal logic to set the interval at which the vehicle is to report an update on its position using the actual speed of the vehicle, and to reduce the interval at which the vehicle is to report the update on its position if the actual speed of the vehicle increases between position reports; and to increase the interval at which the vehicle is to report the update on its position if the actual speed of the vehicle decreases between position reports.

The provision of setting the interval at which the vehicle is to report an update on its position using the actual speed of the vehicle still further provides an improved ability to accurately track the position of the vehicle and perform more accurate predictions of most probable paths and thus setting appropriate future reporting intervals.

According to a sixth embodiment is provided that the method further comprises arranging or configuring the cloud logic or the vehicle internal logic to use a look-up table with stored reporting intervals for given positions with directions in the road network, where the stored reporting intervals of the look-up table are based on most probable paths of the vehicle and the complexity of these most probable paths for the given positions with directions in the road network.

The provision of using a look-up table with stored reporting intervals for given positions with directions in the road network eliminates any need to re-calculate the required reporting interval repeatedly every time a vehicle reports an update on its position.

According to a seventh embodiment is provided that if the look-up table is missing a stored reporting interval for a position reported by the vehicle with direction, it further comprises having the cloud logic or the vehicle internal logic calculate a reporting interval for that position with direction in the road network and populate that reporting interval in the look-up table.

The provision of calculating a reporting interval for a missing reporting interval and populating that reporting interval in the look-up table provides a dynamic completing of the look-up table, especially when a vehicle is entering a section of the road network for which the look-up table is yet not populated with any data, such that the next time a vehicle reports the same position, the cloud logic will be able to find the data in the look-up table.

According to an eight embodiment is provided that the method further comprises that a stored reporting interval for a given position with direction within the road network is set to have an expiry time in the look-up table, and that the stored reporting interval is deleted from the look-up table once it has passed its expiry time.

The provision of setting a stored reporting interval to have an expiry time in the look-up table and deleting the stored reporting interval from the look-up table once it has passed its expiry time facilitates maintaining the look-up table updated, and the required reporting interval for that position and direction in the map may be re-derived as soon as a vehicle reports that position and direction.

According to a ninth embodiment is provided that the method further comprises that the reporting interval for a given position with direction within the road network is re-calculated directly following deletion thereof, and the look-up table populated with this re-calculated reporting interval for that given position with direction in the road network.

The provision of recalculating the reporting interval for a given position with direction within the road network directly after deletion thereof further improves performance as data will be available in the look-up table whenever a vehicle reports that position and further ensure that the look-up table is up to date and adapted to changes in the road network, e.g., added or reopened roads.

According to a tenth embodiment is provided that the method further comprises arranging or configuring the vehicle internal logic to control reporting of a current position of the vehicle to the cloud with the set interval, and, upon receiving a new set interval communication, to adapt the report interval to the new set interval.

The provision of arranging or configuring the vehicle internal logic to control reporting of a current position of the vehicle to the cloud with the set interval and adapting the report interval to any new set interval provides an effective way to ensure that an adaptation of the reporting interval is performed.

According to an eleventh embodiment is provided that the method further comprises arranging or configuring the vehicle internal logic to control reporting of a current position of the vehicle to the cloud with the set interval using a first default reporting interval if no set interval communication has been received.

The provision of using a first default reporting interval if no set interval communication has been received ensures that reporting is performed with an appropriate interval e.g., at start-up of the vehicle or if the set interval communication from the cloud is unavailable for some reason.

According to a twelfth embodiment is provided that the method further comprises arranging or configuring the vehicle internal logic to control reporting of a current position of the vehicle to the cloud to revert to a second default reporting interval if no set interval communication has been received within a predetermined time period, where the second default reporting interval is shorter than that of a most recently previously received set interval communication.

The provision of reverting to a second default reporting interval if no set interval communication has been received within a predetermined time period, where the second default reporting interval is shorter than that of a most recently previously received set interval communication makes it possible to manage a situation where set interval communications from the cloud to reduce the reporting interval has been lost in transmission to the vehicle.

According to an thirteenth embodiment is provided that the cloud based unicast communication with the vehicle comprises safety related information related to one or more positions within the road network ahead of the vehicle; and either the cloud logic or the vehicle internal logic is arranged or configured to reduce the interval at which the vehicle is to report the update on its position upon the vehicle, as determined from at least two position reports, approaching a position within the road network ahead of the vehicle associated with such safety related information.

The provision of reducing the interval at which the vehicle is to report the update on its position upon the vehicle approaching a position within the road network ahead of the vehicle associated with such safety related information makes it possible for the cloud to update the safety related information to the vehicle more often, making the safety related information more accurate, especially with respect to any information regarding position and distance.

According to an fourteenth embodiment is provided that the method further comprises using an historical travel pattern of the vehicle within the road network to optimize the most probable path of this specific vehicle through arranging or configuring the cloud logic or the vehicle internal logic to keep track of typical routes within the road network that this specific vehicle often follows and use this historical travel pattern within the road network to predict a unique most probable path for this specific vehicle.

The provision of using the vehicle's historical travel pattern in the road network to optimize the most probable path of this specific vehicle enables improved prediction of the probability of branches in the most probable path for that specific vehicle, thus enabling an improved dynamic adaptation of the reporting interval.

According to another embodiment is provided a system for minimizing the required bandwidth for a cloud based unicast communication with a vehicle which is connected to the cloud and operates within a road network, where the cloud comprises a cloud logic and the vehicle comprises a vehicle internal logic, the system comprising: a positioning arrangement for determining a current position with direction of the vehicle within the road network; an interval setting arrangement for setting an interval at which the vehicle is to report an update on its position to the cloud based on a most probable path of the vehicle and the complexity of this most probable path, where the most probable path of the vehicle is a set of possible paths a predetermined distance ahead of the vehicle that the vehicle is most probable to travel along given its current position with direction within the road network; a communication arrangement for communicating the set interval to the vehicle internal logic; a reporting arrangement for reporting an updated current position of the vehicle to the cloud with the set reporting interval, and in accordance with the above method.

A system as above provides for minimizing the required bandwidth through reducing the required amount of data traffic caused by the position reporting in a cloud based unicast communication with a vehicle which is connected to the cloud of this kind, which position reporting, in order to keep the location of the vehicle up-to-date, will constitute a significant part of the overall data traffic occurring.

BRIEF DESCRIPTION OF THE DRAWINGS

In the following, embodiments herein will be described in greater detail by way of example only with reference to attached drawings, in which.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
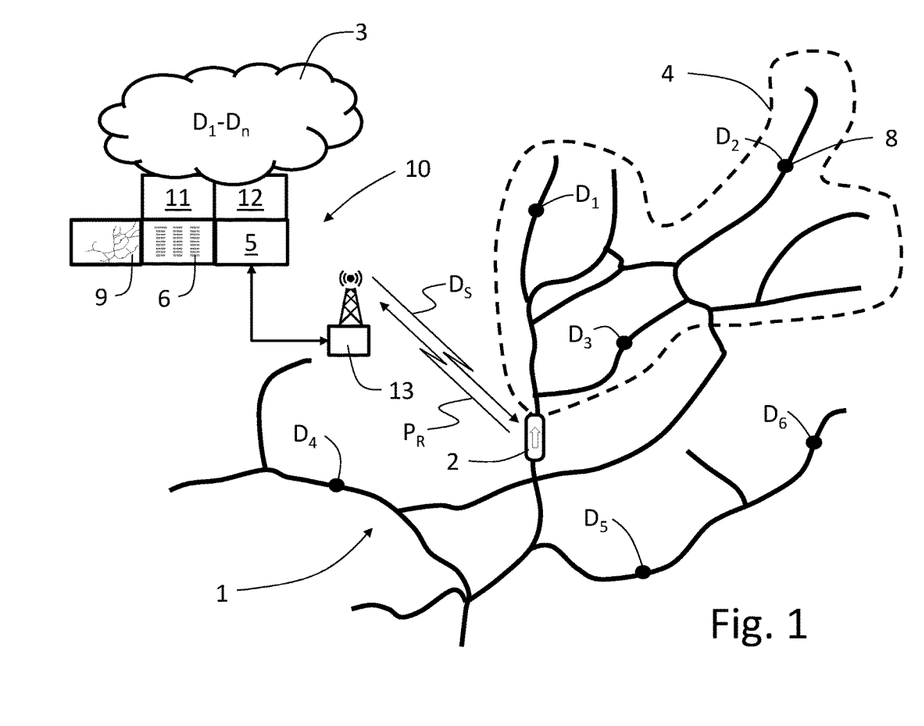
FIG. 1 is a schematic illustration of a method and system for minimizing the required bandwidth for a cloud based unicast communication with a vehicle which is connected to the cloud and operates within a road network.

The present disclosure proposes, and illustrates in FIG. 1, a solution to how to minimize the required bandwidth, here referring to the required amount of data traffic, for a cloud 3 based unicast communication with a vehicle 2 which is connected to the cloud 3 and operates within a road network 1.

Such a cloud 3 based unicast communication relevant for this improvement is used to dispatch information only to a subset of connected vehicles 2 (only one is shown in FIG. 1) operating in a road network 1 to which the information is relevant. One type of data is safety related data used in a vehicle 2 to inform and warn a driver of various hazards ahead of the vehicle 2 in order to reduce the risk of road accidents.

In such a relevant cloud 3 based unicast communication, only data describing a traffic event close to, and ahead of, a vehicle 2 is considered relevant to that specific vehicle 2. Data behind the vehicle 2 or data related to roads that the vehicle 2 cannot access is considered irrelevant and should not be sent to the vehicle 2, not even if the data is related to a position very close to the vehicle 2. Thus, in order to select which subset $D_S$ of data $D_1$-$D_n$ stored in a cloud 3 that shall be sent to each respective vehicle 2 connected to the cloud 3 a calculated most probable path 4 of the vehicle 2 is relied on.

The most probable path 4 of the vehicle 2 is the set of possible paths a predetermined distance ahead of the vehicle 2 that the vehicle 2 is most probable to travel along given its current position with direction within the road network. The set of all possible paths ahead of the vehicle 2 in FIG. 1 is thus the roads encircled by the dashed line 4.

The direction of the vehicle 2 is illustrated in FIG. 1 by the arrow overlaid the vehicle 2. Direction of a vehicle 2, as used herein, refers to the direction of travel of the vehicle 2, or if the vehicle 2 is stationary, its most recent direction of travel, or the direction in which the vehicle 2 is oriented considering its primary direction of travel, normally forward.

The most probable path 4 of the vehicle 2 is used to select a relevant subset of data $D_S$ related to the road network 1 in order to send it to the vehicle 2. If the subset of data $D_S$ is related to a point or segment in the road network 1 that is, or partly is, in the most probable path 4 of the vehicle 2, then that subset of data $D_S$ shall be sent to that vehicle 2.

In FIG. 1 the relevant subset of data $D_S$ consist of data items $D_1$, $D_2$ and $D_3$ which all are related to a point or segment in the road network 1 that is, or partly is, in the most probable path 4 of the vehicle 2. Data items D4, D5 and D6, however, are not related to a point or segment in the road network 1 that is, or partly is, in the most probable path 4 of the vehicle 2, and therefore not included in the relevant subset of data $D_S$.

The method and system for minimizing the required bandwidth for a cloud 3 based unicast communication with a vehicle 2, which is connected to the cloud 3 and operates within a road network 1, is based on the realization that a cloud 3 based unicast communication relevant for this improvement, as described above, depends heavily upon position reporting $P_R$, which, in order to keep the location of the vehicle 2 up-to-date, will constitute a significant part of the overall data traffic occurring.

Thus, it is envisaged that it will be possible to minimize the required bandwidth for a cloud 3 based unicast communication with a vehicle 2 which is connected to the cloud 3 and operates within a road network 1 through reducing the required amount of data traffic caused by the position reporting $P_R$.

Figure 2:
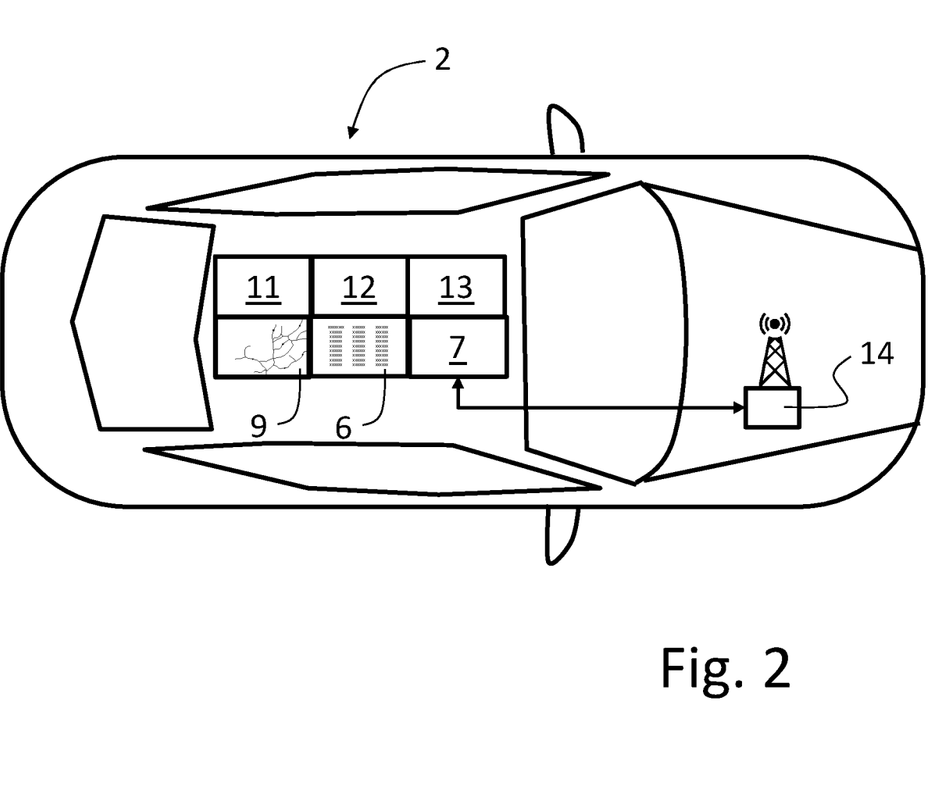
FIG. 2 is a schematic illustration of a vehicle adapted to the method and system according to FIG. 1.

Accordingly, embodiments herein aim to provide an improved method for minimizing the required bandwidth for a cloud 3 based unicast communication with a vehicle 2 which is connected to the cloud 3 and operates within a road network 1, where the cloud 3 comprises a cloud logic 5 and the vehicle, as illustrated in FIG. 2, comprises a vehicle internal logic 7.

Figure 3:
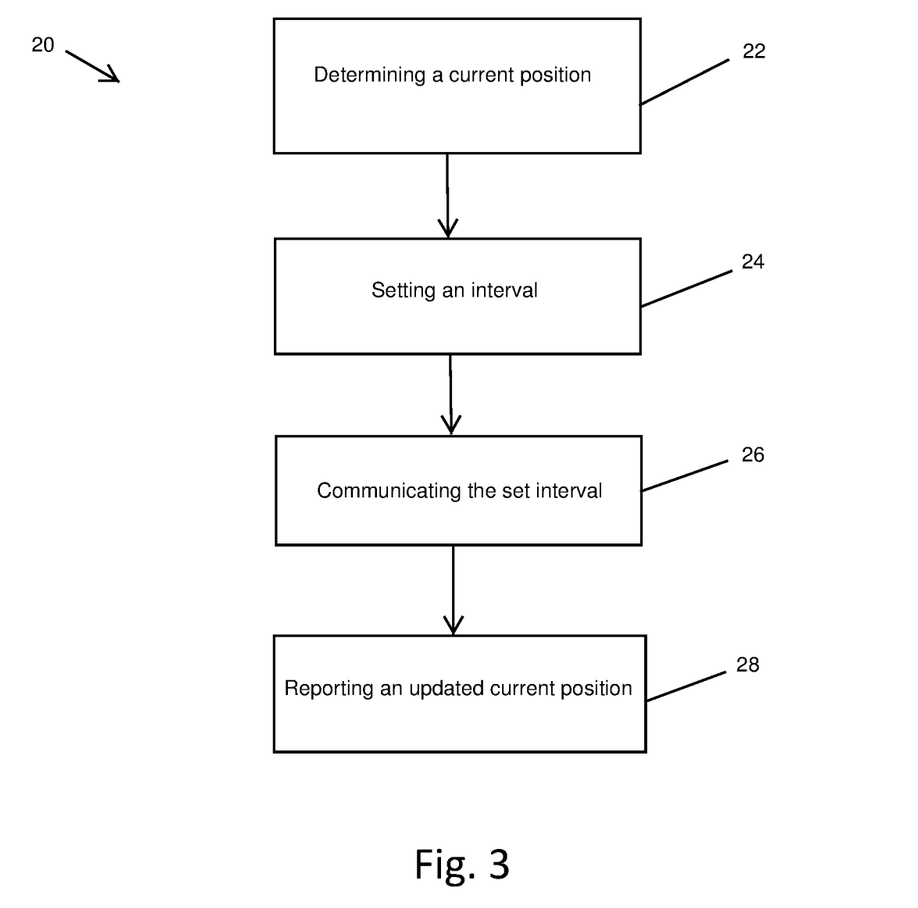
FIG. 3 is an illustration of the method according to the present disclosure.

This is provided as shown in FIG. 3 through a method 20 that comprises the steps of: determining 22 a current position with direction of the vehicle 2 within the road network 1; setting 24 an interval at which the vehicle 2 is to report an update on its position to the cloud 3 based on a most probable path 4 of the vehicle 2 and the complexity of this most probable path 4, where the most probable path 4 of the vehicle 2 is a set of possible paths a predetermined distance ahead of the vehicle 2 that the vehicle 2 is most probable to travel along given its current position with direction within the road network 1; communicating 26 the set interval to the vehicle 2 internal logic; reporting 28 an updated current position of the vehicle 2 to the cloud 3 with the set reporting interval, thus providing for minimizing the required bandwidth through reducing the required amount of data traffic caused by the position reporting $P_R$ in a cloud 3 based unicast communication with a vehicle 2 which is connected to the cloud 3 of this kind.

The current position of the vehicle 2 within the road network 1 can e.g., be determined using data from a satellite based navigation system, such as a GPS system, or similar, carried by the vehicle 2, or using other positioning methods well known to a person skilled in the art. The position reported from the vehicle 2 may be a raw GPS-position that has not yet been map matched, and thus may include an offset from the road network 1. However, in order to determine the current position of the vehicle 2 within the road network 1, the position will be matched to a map 9, e.g., a digital map, of the road network 1, thus eliminating or at least reducing the above mentioned offset.

The current direction of the vehicle 2 within the road network 1 may likewise e.g., be determined using data from a satellite based navigation system, such as a GPS system, or similar, carried by the vehicle 2, or derived, e.g., by the cloud logic 5 or the vehicle 2 internal logic 7, from two or more consecutive or subsequent position reports $P_R$.

It should be noted that the most probable path 4 is not confined to one specific route ahead of the vehicle 2 but to the set of possible routes ahead of the vehicle 2, as specified above. The most probable path 4 thus is a subset of the complete road network 1. It is delimited, e.g., by the predetermined distance, to include a relevant subset as required by the intended application. Further limitations as to which possible routes ahead of the vehicle 2 that should be included and/or excluded from the most probable path 4 is thus possible to tailor to the intended application.

Furthermore, according to some embodiments herein is provided that the method further comprises having the cloud logic 5 or the vehicle internal logic 7 set the interval at which the vehicle 2 is to report an update on its position, through determining the most probable path 4 of the vehicle 2 and analyzing the determined most probable path 4 with respect to complexity using a map 9 of the road network 1. The complexity the of road network of the map 9 included in the most probable path 4 provides an intuitive and effective way of defining the interval at which a vehicle 2 should report its position in order to minimize the required amount of data traffic between the vehicle 2 and the cloud 3.

Thus, in accordance herewith is proposed a dynamically set interval at which the vehicle 2 reports its current position to the cloud 3. According to this solution, the interval at which each vehicle 2 reports its current position is individually and dynamically adjustable. Based on the position of a vehicle 2, as reported by the vehicle 2 to the cloud 3, the cloud logic 5 is arranged or configured to analyze the structure of the road network 1 ahead of the vehicle 2, or around the vehicle 2, to assess how the vehicle 2 can continue its path in the road network 1. Alternatively, if of sufficient capacity, the vehicle internal logic 7 can be arranged or configured to perform this analysis.

When the vehicle 2 is located in a complex road context, where there is a multitude of alternative paths ahead, e.g., this being the case in a dense road network 1 with many different connected roads, such as in a city center, the interval would typically have to be shorter. The motive would be that in such a complex road context, where there are multiple alternative routes ahead of the vehicle 2, the vehicle 2 would have to report its position more frequently in order for the cloud 3 to be able to track the position of the vehicle 2 and predict a most probable path 4 of the vehicle 2.

In less complex road contexts, e.g., when the vehicle 2 is driving along a highway where there are fewer alternative routes ahead of the vehicle 2, the cloud logic 5 could accurately predict the most probable path 4 of the vehicle 2 also if the vehicle 2 is reporting its position less often. In such scenarios, it makes since to increase the reporting interval, since it will reduce the bandwidth usage without any negative consequence to the intended application.

Thus, according to some embodiments the method further comprises arranging or configuring the cloud logic 5 or the vehicle internal logic 7 to reduce the interval at which the vehicle 2 is to report the update on its position if the complexity of the determined most probable paths 4 increases between position reports $P_R$, e.g., two or more consecutive or subsequent position reports $P_R$; and to increase the interval at which the vehicle 2 is to report the update on its position if the complexity of the determined most probable paths 4 decreases between position reports $P_R$, e.g., two or more consecutive or subsequent position reports $P_R$, thus providing an improved ability to accurately track the position of the vehicle 2 and perform more accurate predictions of most probable paths 4 and thus setting appropriate future reporting intervals.

In short, the idea presented herein is to have the cloud logic 5 or the vehicle internal logic 7, given a vehicle's present position, use a map 9 of the road network 1 available in the cloud logic 5 or the vehicle internal logic 7 to define the longest interval at which the vehicle 2 should report its position, in order for the cloud logic 5 or the vehicle internal logic 7 to accurately predict the most probable path 4 of the vehicle 2.

The cloud logic 5 or the vehicle internal logic 7 is then arranged or configured to communicate this set interval at which the vehicle 2 reports its position to the vehicle internal logic 7, or more precisely to a reporting interval control section thereof, which in turn adapts and reports the position of the vehicle 2 to the cloud 3 with the adjusted interval. It should be noted that each vehicle 2 connected to the cloud 3 will thus be communicated a unique message defining a specific individual required reporting interval, dependent on the unique position of that unique vehicle 2 and an associated most probable path 4 of that unique vehicle 2.

It is also envisaged that the map 9 used for determining the most probable path 4, in addition to the road network 1 structure may include additional information related to at least some of the roads included therein, such as e.g., speed limit information. In accordance with such embodiments the method further comprises arranging or configuring the cloud logic 5 or the vehicle internal logic 7 to determine the interval at which the vehicle 2 is to report an update on its position using a map 9 of the road network comprising speed limits for road segments included in the most probable path 4, and to reduce the interval at which the vehicle 2 is to report the update on its position if the speed limits of the determined most probable paths 4 increases between position reports $P_R$, e.g., two or more consecutive or subsequent position reports $P_R$; and to increase the interval at which the vehicle 2 is to report the update on its position if the speed limits of the determined most probable paths 4 decreases between position reports $P_R$, e.g., two or more consecutive or subsequent position reports $P_R$, further providing an improved ability to accurately track the position of the vehicle 2 and perform more accurate predictions of most probable paths 4 and thus setting appropriate future reporting intervals.

However, it is also feasible to use the actual speed of the vehicle 2 as an input for determining the required reporting interval. In accordance with such embodiments the method further comprises arranging or configuring the cloud logic 5 or the vehicle internal logic 7 to set the interval at which the vehicle 2 is to report an update on its position using the actual speed of the vehicle 2, and to reduce the interval at which the vehicle 2 is to report the update on its position if the actual speed of the vehicle 2 increases between position reports $P_R$, e.g., two or more consecutive or subsequent position reports $P_R$; and to increase the interval at which the vehicle 2 is to report the update on its position if the actual speed of the vehicle decreases between position reports $P_R$, e.g., two or more consecutive or subsequent position reports $P_R$, providing an improved ability to accurately track the position of the vehicle 2 and perform more accurate predictions of most probable paths 4 and thus setting appropriate future reporting intervals.

The actual speed of the vehicle 2 may e.g., be derived from a vehicle 2 speedometer, from a satellite based navigation system, such as a GPS system, or similar, carried by the vehicle 2, or derived, e.g., by the cloud logic 5 or the vehicle internal logic 7, from two or more consecutive or subsequent position reports $P_R$.

It is noted that any vehicle 2 that is located at a specific location and is travelling in a certain direction within the road network 1 would typically have to report its position using the same interval as any other vehicle 2 in the same location and travelling in the same direction. The required reporting interval can thus be derived from the position and direction of travel in a road network 1 regardless which vehicle 2 that is in that specific position and travels in that specific direction. The required reporting interval for a vehicle 2 can thus be regarded as a function of the position and direction of travel within the road network 1 structure rather than a function of a vehicle's unique state. Hence, the only dependence to the required reporting interval from the vehicle 2 is its position and direction of travel within the road network 1.

Based on this realization it is suggested, according to some embodiments herein, that the method further comprises arranging or configuring the cloud logic 5 or the vehicle internal logic 7 to use a look-up table 6 with stored reporting intervals for given positions with directions in the road network 1, where the stored reporting intervals of the look-up table 6 are based on most probable paths 4 of the vehicle 2 and the complexity of these most probable paths 4 for the given positions with directions in the road network 1, thus eliminating any need to re-calculate the required reporting interval repeatedly every time the vehicle 2 reports an update on its position.

Thus, for any position with direction in the road network 1, there will be an entry in the look-up table 6 from which the pre-calculated corresponding reporting interval is quickly retrievable. This will significantly improve the performance of the cloud logic 5 or the vehicle internal logic 7 and allow the solution to scale to a larger population of connected vehicles 2.

In some embodiments herein the look-up table 6 is provided as data related to stored reporting intervals for given positions with directions in the road network 1 added to a digital map 9 data structure of the road network 1, with data related to stored reporting intervals added for positions along every road segment or road node represented in the digital map 9 data structure.

In further embodiments it is envisaged to include an algorithm in the cloud logic 5 or the vehicle internal logic 7 that will be able to calculate the required reporting performance for each position in the road network and an associated direction of travel in the road network 1. The algorithm can be called whenever a vehicle 2 is entering a section of the road network 1 for which the look-up table 6 is yet not populated with any data regarding the required reporting interval. However, it is envisaged that whenever the look-up table 6 includes an entry with a pre-calculated required reporting interval, it will use that entry.

A possible strategy to build and maintain such a look-up table 6 of required reporting interval per location and direction in the road map 9 is to dynamically populate the look-up table 6 whenever a vehicle 2 report a position with direction for which there is not yet any data in the look-up table 6. As soon as the algorithm has calculated the required reporting interval for the road section, the cloud logic 5 or the vehicle internal logic 7 will add the data to the look-up table 6. The next time a vehicle 2 reports the same position, the cloud logic will be able to find the data in the look-up table 6, and there will be no need to call the algorithm that calculates the required reporting interval. This is beneficial since it will be quicker to retrieve data from the look-up table 6 rather than running the algorithm that calculates the data. When vehicles 2 often report the same position, as will be the case for most roads with dense traffic, the use of a look-up table 6, as described above, will contribute to a significant optimization of workload in the cloud logic 5 or the vehicle internal logic 7.

Accordingly, in some embodiments is provided that if the look-up table 6 is missing a stored reporting interval for a position reported by the vehicle 6 with direction, it further comprises having the cloud logic 5 or the vehicle internal logic 7 calculate a reporting interval for that position with direction in the road network 1 and populate that reporting interval in the look-up table 6. Hereby will be provided a dynamic completing of the look-up table 6, especially when a vehicle 2 is entering a section of the road network for which the look-up table 6 is yet not populated with any data, such that the next time a vehicle 2 reports the same position, the cloud logic will be able to find the data in the look-up table 6.

In order to maintain the look-up table 6 updated, any data in the look-up table 6 could be set to expire after some time, e.g., a year. When data has expired it is removed and the required reporting interval for that position and direction in the map 9 will have to be re-derived, e.g., as soon as a vehicle 2 reports that position and direction in the road network 1.

Consequently, according to some embodiments the method further comprises that a stored reporting interval for a given position with direction within the road network 1 is set to have an expiry time in the look-up table 6, and that the stored reporting interval is deleted from the look-up table 6 once it has passed its expiry time, thus facilitating maintaining the look-up table 6 updated, and that the required reporting interval for that position and direction in the road network 1 may be re-derived as soon as a vehicle 2 reports that position and direction.

Alternatively, to improve performance, in other embodiments the reporting interval is re-calculated directly after deletion thereof, in order to have the data available in the look-up table 6 whenever a vehicle 2 reports its position at that road segment. This strategy will also accommodate for changes in the road network, e.g., added roads. Thus, according to some alternative embodiments the method further comprises that the reporting interval for a given position with direction within the road network 1 is re-calculated directly following deletion thereof, and the look-up table 6 populated with this re-calculated reporting interval for that given position with direction in the road network 1, thus improving performance as data will be available in the look-up table 6 whenever a vehicle 2 reports that position. Hereby it becomes possible to avoid a higher latency for the next vehicle 2 reporting its position in that location, and further to ensure that the look-up table 6 is up to date and adapted to changes in the road network 1, e.g., removed, closed, added or reopened roads.

Alternatively, instead of deleting the reporting interval from the look-up table 6 once it has passed its expiry time and then re-calculating an updated reporting interval, it is possible to re-calculate an updated the reporting interval first and then compare it to the existing reporting interval and replace the entry in the look-up table 6 only if the re-calculated and the existing entry are different. This will lead to higher availability and less workload and further eliminates any time gap between deletion and update.

Furthermore, in some embodiments, in order to account for changes in the road network 1, the reporting interval can be recalculated only for such sections of a map 9 that are updated. This will reduce the amount of recalculations necessary each time the map 9 is updated. According to such embodiments of the method, upon updating the digital map 9 data structure the reporting interval is recalculated for positions along each respective road segment or road node of the digital map 9 data structure that is updated and the look-up table 6 updated correspondingly.

According to some embodiments herein, in order to ensure that the interval at which each vehicle 2 can report its current position is individually and dynamically adjustable, the method further comprises arranging or configuring the vehicle internal logic 7 to control reporting of a current position of the vehicle 2 to the cloud 3 with the set interval, and, upon receiving a new set interval communication, to adapt the report interval to the new set interval, providing an effective way to ensure that an individual adaptation of the reporting interval is performed dynamically.

As a backup, the vehicle 2 will, according to some embodiments, have a default interval at which it will report its position when no set interval communication has been received, e.g., at start-up of the vehicle 2 or if the set interval communication is unavailable for some reason. Thus, according to some embodiments the method further comprises arranging or configuring the vehicle internal logic 5 to control reporting of a current position of the vehicle 2 to the cloud 3 with the set interval using a first default reporting interval if no set interval communication has been received, thus ensuring that reporting is performed with an appropriate interval e.g., at start-up of the vehicle 2 or if the set interval communication is unavailable for some reason.

Further, in order to manage a situation where a set interval communication to decrease the interval is lost in transmission to the vehicle 2, the vehicle logic 5 includes a strategy where the reporting interval is resumed to a second default (shorter) interval if there has been no new data received from the cloud 3 within some set time period. Thus, according to some embodiments the method further comprises arranging or configuring the vehicle internal logic 5 to control reporting of a current position of the vehicle 2 to the cloud 3 to revert to a second default reporting interval if no set interval communication has been received within a predetermined time period, where the second default reporting interval is shorter than that of a most recently previously received set interval communication.

In a further embodiment, data from the cloud 3 to the receiving vehicle 2 will include safety related information related to some traffic situation ahead of the vehicle 2. The information will obviously be dependent on the present position of the receiving vehicle 2.

When a vehicle 2 is close to the position 8 of some safety related data that has been reported to the cloud 3 or otherwise received to the cloud 3, the cloud logic 5, or vehicle internal logic 7, will be arranged or configured to decrease the interval at which the vehicle 2 is reporting its position to the cloud 3. This serves the purpose to enable the cloud 3 to send new updated messages to the vehicle 2, based on its latest reported position, including more accurate safety related data related to some road location ahead of the receiving vehicle 2. If the vehicle 2 reports its position more frequently, the cloud 3 will be able to update the safety message to the vehicle 2 more often, thus enabling the safety related data to be more accurate, especially with respect to any position and distance data in the message.

Thus, according to some embodiments herein, the cloud 3 based unicast communication with the vehicle 2 may comprise safety related information related to one or more positions 8 within the road network 1 ahead of the vehicle 2; and either the cloud logic 5 or the vehicle internal logic 7 is arranged or configured to reduce the interval at which the vehicle 2 is to report the update on its position upon the vehicle 2, as determined from at least two position reports $P_R$, e.g., two or more consecutive or subsequent position reports $P_R$, approaching a position 8 within the road network 1 ahead of the vehicle 2 associated with such safety related information. Hereby it is possible for the cloud 3 to update the safety related information to the vehicle 2 more often, making the safety related information more accurate, especially with respect to any information regarding position and distance.

In additions, to improve the predictability of the most probable path 4, a vehicle's historical pattern can be used to further optimize the most probable path 4 of a specific vehicle 2. If the cloud logic 5 or the vehicle internal logic 7 keeps track of typical routes that a unique vehicle 2 often follows, the cloud logic 5 or the vehicle internal logic 7 will be able to better predict the unique most probable path 4 for that unique vehicle 2.

According to such embodiments the method further comprises using an historical travel pattern of the vehicle 2 within the road network 1 to optimize the most probable path 4 of this specific vehicle 2 through arranging or configuring the cloud logic 5 or the vehicle internal logic 7 to keep track of typical routes within the road network 1 that this specific vehicle 2 often follows and use this historical travel pattern within the road network 1 to predict a unique most probable path 4 for this specific vehicle 2. This enables improved prediction of the probability of branches in the most probable path for that specific vehicle, and thereby also an improved dynamic adaptation of the reporting interval.

For embodiments using the vehicle's historical travel pattern and incorporating a look-up table 6 the method may comprise that a reporting interval based on the unique most probable path 4 for the specific vehicle 2 is included in the look-up table 6. The look-up table 6 will then include unique entries for each vehicle 2 for those locations in the road maps 9 where the respective vehicles have strong patterns of habitual travels.

Furthermore, as the most probable path 4 will typically include a number of alternative branches that a vehicle 2 could follow. Each branch is an alternative for the continued route but not all branches will actually be followed. In some cases, it can be concluded that it will be more likely that the vehicle 2 will follow some branches and less likely that it will follow some other alternative branches in the most probable path 4. In such cases, the probability of a vehicle 2 ending up in the various positions in the most probable path 4 will be the product of the probability that the vehicles enters each branch leading to that point in the most probable path 4. Given this, it is possible to associate a probability to each point or segment in the most probable path 4, based on a location and the probability that the vehicle 2 will pass that location (point or segment) in the most probable path 4.

In the general case, a vehicle 2 is more likely to follow larger roads, or to follow roads where traffic flow is known to be higher. The calculation of the probability in the most probable path 4 can be further improved through the usage of the historical pattern for a specific vehicle 2, as described above. A certain vehicle 2 might not follow the typical traffic stream but might most often follow another route, e.g., to a workplace or a residence. Such historical route data for a specific vehicle 2 can be used to better predict the probability of branches in the most probable path 4 for that specific vehicle 2.

Additionally, routes with very low traffic flow may be chosen not to be added to the look-up table 6 in order to reduce storage requirements and improve look-up times.

Disclosed herein is also a system 10 for minimizing the required bandwidth for a cloud 3 based unicast communication with a vehicle 2 which is connected to the cloud 3 and operates within a road network 1, where the cloud 3 comprises a cloud logic 5 and the vehicle 2 comprises a vehicle internal logic 7, the system comprising: a positioning arrangement 11 for determining a current position with direction of the vehicle 2 within the road network 1; an interval setting arrangement 12 for setting an interval at which the vehicle 2 is to report an update on its position to the cloud 3 based on a most probable path 4 of the vehicle 2 and the complexity of this most probable path 4, where the most probable path 4 of the vehicle 2 is a set of possible paths a predetermined distance ahead of the vehicle 2 that the vehicle 2 is most probable to travel along given its current position with direction within the road network 1; a communication arrangement 13 for communicating the set interval to the vehicle internal logic 7; a reporting arrangement 14 for reporting an updated current position of the vehicle 2 to the cloud 3 with the set reporting interval.

As is illustrated in FIGS. 1 and 2 the various functionalities of the system 10 and according to the method described herein may be distributed between the cloud 3 and the vehicle 2, dependent on the capabilities of the cloud logic 5 and the vehicle internal logic 7 respectively.

The positioning arrangement 11 can e.g., be arranged or configured to determine a current position with direction of the vehicle 2 within the road network 1 using data from a satellite based navigation system, such as a GPS system, or similar, carried by the vehicle 2, or using other positioning methods well known to a person skilled in the art. The position reported from the vehicle 2 may be a raw GPS-position that has not yet been map matched, and thus may include an offset from the road network 1. However, in order to determine the current position of the vehicle 2 within the road network 1, the position will be matched to a map 9, e.g., a digital map, of the road network 1, thus eliminating or at least reducing the above mentioned offset. The map matching and determination of the current position with direction of the vehicle 2 within the road network 1 may be performed in the cloud 3 or by the vehicle 2.

The interval setting arrangement 12 for setting the interval at which the vehicle 2 is to report an update on its position to the cloud 3 may likewise reside in the cloud 3 or the vehicle 2.

The communication arrangement 13 will either reside in the cloud 3 and be arranged or configured to communicate the set interval to the vehicle internal logic 7, e.g., via a wireless communications link, or alternatively reside in the vehicle 2 and be arranged or configured to communicate the set interval to the vehicle internal logic 7, e.g., via a vehicle 2 internal communications bus.

The reporting arrangement 14 will reside in the vehicle 2 and be arranged or configured to report the updated current position of the vehicle 2 to the cloud 3, e.g., via a wireless communications link.

It should be noted that the vehicle 2, cloud 3, cloud logic 5, vehicle internal logic 7, positioning arrangement 11, interval setting arrangement 12, communication arrangement 13, reporting arrangement 14 and/or any other arrangement, system, unit and/or device described herein may comprise one or more appropriately programmed processors and/or servers (e.g., one or more microprocessors including central processing units (CPU)) and associated memory, which may include stored operating system software and/or application software executable by the server(s) and/or processor(s) for controlling operation thereof and for performing the particular algorithms represented by the various functions and/or operations described herein, including interaction between and/or cooperation with each other. It should also be noted that the vehicle 2, cloud 3, cloud logic 5, vehicle internal logic 7, positioning arrangement 11, interval setting arrangement 12, communication arrangement 13, and/or reporting arrangement 14 may further comprise or be arranged or configured to cooperate with any type of storage device or arrangement known in the art, such as optical, solid state, disk and/or tape storage devices and controllers and/or one or more storage area networks, which may for example be used for storing look-up table 6 and/or map data 9. The vehicle 2, cloud 3, cloud logic 5, look-up table 6, vehicle internal logic 7, map data 9, positioning arrangement 11, interval setting arrangement 12, communication arrangement 13, and/or reporting arrangement 14 may further comprise any computer hardware and software and/or electrical hardware known in the art configured to enable communication therebetween, which may include cellular and/or other wireless networks.

The cloud 3, cloud logic 5, look-up table 6, map data 9, positioning arrangement 11, interval setting arrangement 12, and/or communication arrangement 13 may be provided at a single or a central location or at multiple different locations. The method and system 10 described herein may provide for distributed client-server computing involving the vehicle 2, cloud 3, cloud logic 5, look-up table 6, vehicle internal logic 7, map data 9, positioning arrangement 11, interval setting arrangement 12, communication arrangement 13, and/or reporting arrangement 14 over one or more networks as described herein.

Further embodiments of the system 10 are envisaged encompassing functionality in accordance with the various embodiments of the above described method.

A system 10 as above provides for minimizing the required bandwidth through reducing the required amount of data traffic caused by the position reporting in a cloud 3 based unicast communication with a vehicle 2, which is connected to the cloud 3, of this kind, which position reporting, in order to keep the location of the vehicle 2 up-to-date, will constitute a significant part of the overall data traffic occurring.

It is envisaged that embodiments according to the above described method and system 10 will be highly relevant for cloud 3 based safety application as well as applications for autonomous vehicles 2 which are dependent on cloud 3 based data.

Thus, hereby is provided a system 10 implementation that will manage bandwidth frugally and not incur unmotivated cost for data traffic, especially if that data traffic is routed over a cell network, thus suitable for lowest latency unicast routing in cloud 3 based vehicle 2 safety applications.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for minimizing a required bandwidth for a cloud based unicast communication with a vehicle which is connected to a cloud and operates within a road network, where the cloud comprises a cloud logic and the vehicle comprises a vehicle internal logic, the method comprising:
   determining, by a positioning arrangement, a current position including direction of the vehicle within the road network;
   setting, by an interval setting arrangement, an interval at which the vehicle is to report an update on the current position of the vehicle to the cloud based on a most probable path of the vehicle and the complexity of this most probable path, where the most probable path of the vehicle is a set of possible paths a predetermined distance ahead of the vehicle that the vehicle is most probable to travel along given the current position including direction of the vehicle within the road network;
   communicating, by a communication arrangement, the set interval to the vehicle internal logic; and
   reporting, by a reporting arrangement, the current position of the vehicle as an updated current position of the vehicle to the cloud with the set interval.

2. The method according to claim 1 wherein the cloud logic or the vehicle internal logic is configured to set the interval at which the vehicle is to report an update on its position through determining the most probable path of the vehicle and analyze the determined most probable path with respect to complexity using a map of the road network.

3. The method according to claim 2 wherein the cloud logic or the vehicle internal logic is configured to reduce the interval at which the vehicle is to report the update on its position if the complexity of the determined most probable paths increases between position reports, and to increase the interval at which the vehicle is to report the update on its position if the complexity of the determined most probable paths decreases between position reports.

4. The method according to claim 2 wherein the cloud logic or the vehicle internal logic is configured to determine the interval at which the vehicle is to report an update on its position using a map of the road network comprising speed limits for road segments included in the most probable path and to reduce the interval at which the vehicle is to report the update on its position if the speed limits of the determined most probable paths increases between position reports, and to increase the interval at which the vehicle is to report the update on its position if the speed limits of the determined most probable paths decreases between position reports.

5. The method according to claim 2 wherein the cloud logic or the vehicle internal logic is configured to set the interval at which the vehicle is to report an update on its position using the actual speed of the vehicle and to reduce the interval at which the vehicle is to report the update on its position if the actual speed of the vehicle increases between position reports, and to increase the interval at which the vehicle is to report the update on its position if the actual speed of the vehicle decreases between position reports.

6. The method according to claim 1 wherein the cloud logic or the vehicle internal logic is configured to use a look-up table with stored reporting intervals for given positions including directions in the road network, where the stored reporting intervals of the look-up table are based on most probable paths of the vehicle and the complexity of these most probable paths for the given positions including directions in the road network.

7. The method according to claim 6 wherein, if the look-up table is missing a stored reporting interval for a position reported by the vehicle including direction, the cloud logic or the vehicle internal logic is configured to calculate a reporting interval for that position including direction in the road network and populate that reporting interval in the look-up table.

8. The method according to claim 6 wherein a stored reporting interval for a given position including direction within the road network is set to have an expiry time in the look-up table, and the stored reporting interval is deleted from the look-up table once it has passed its expiry time.

9. The method according to claim 8 wherein the reporting interval for a given position including direction within the road network is re-calculated directly following deletion thereof, and the look-up table is populated with this re-calculated reporting interval for that given position including direction in the road network.

10. The method according to claim 1 wherein the vehicle internal logic is configured to control reporting of a current position of the vehicle to the cloud with the set interval and, upon receiving a new set interval communication, to adapt the report interval to the new set interval.

11. The method according to claim 10 wherein the vehicle internal logic is configured to control reporting of a current position of the vehicle to the cloud with the set interval using a first default reporting interval if no set interval communication has been received.

12. The method according to claim 10 wherein the vehicle internal logic is configured to control reporting of a current position of the vehicle to the cloud to revert to a second default reporting interval if no set interval communication has been received within a predetermined time period, where the second default reporting interval is shorter than that of a most recently previously received set interval communication.

13. The method according to claim 1 wherein the cloud based unicast communication with the vehicle comprises safety related information related to one or more positions within the road network ahead of the vehicle, and wherein either the cloud logic or the vehicle internal logic is configured to reduce the interval at which the vehicle is to report the update on its position upon the vehicle, as determined from at least two position reports, approaching a position within the road network ahead of the vehicle associated with such safety related information.

14. The method according to claim 1 further comprising using an historical travel pattern of the vehicle within the road network to optimize the most probable path of this specific vehicle through arranging or configuring the cloud logic or the vehicle internal logic to keep track of typical routes within the road network that this specific vehicle often follows and use this historical travel pattern within the road network to predict a unique most probable path for this specific vehicle.

15. A system for minimizing a required bandwidth for a cloud based unicast communication with a vehicle which is connectable to a cloud and operable within a road network, where the cloud comprises a cloud logic and the vehicle comprises a vehicle internal logic, the system comprising:
   a positioning arrangement for determining a current position including direction of the vehicle within the road network;
   an interval setting arrangement for setting an interval at which the vehicle is to report an update on the current position of the vehicle to the cloud based on a most probable path of the vehicle and the complexity of this most probable path, where the most probable path of the vehicle is a set of possible paths a predetermined distance ahead of the vehicle that the vehicle is most probable to travel along given the current position including direction of the vehicle within the road network;
   a communication arrangement for communicating the set interval to the vehicle internal logic; and
   a reporting arrangement for reporting the current position of the vehicle as an updated current position of the vehicle to the cloud with the set interval.

* * * * *